United States Patent
Janeke (10) Patent No.: US 6,470,680 B1
(45) Date of Patent: Oct. 29, 2002

(54) MANIFOLD ALTERNATOR GENERATOR

(76) Inventor: Charl E Janeke, 26645 Swam La., Santa Clarita, CA (US) 91387

( * ) Notice: Subject to any disclaimer, the term of this patent is extended or adjusted under 35 U.S.C. 154(b) by 0 days.

(21) Appl. No.: 09/525,795

(22) Filed: Mar. 15, 2000

(51) Int. Cl.[7] .............................................. F02G 1/00
(52) U.S. Cl. .......................................... 60/597; 60/624
(58) Field of Search .................................. 60/597, 624

(56) References Cited

U.S. PATENT DOCUMENTS 5,400,596 A * 3/1995 Shlien ......................... 60/597
5,857,336 A * 1/1999 Paul et al. .................... 60/597

OTHER PUBLICATIONS

Technology Update, Paul Van Valkenburgh, "Electric Valves—They might–just might–make the electric car obsolete", Road & Track, Jun. 1998, pp. 170–171, http://www.aurasystems.com/articles/road&track_june98_1.jpg.
Aura Systems, Inc.: Automotive & Industrial—EVA (Electromagnetic Valve Actuator), Electromagnetic Valve Actuator System (EVA), 2000, Aura Systems, Inc., http://www.aurasystems.com/autoeva.htm.
Motorsports Wire, Press Release, Aura Systems, Inc., "Aura Systems Announces Renewed Contract with Yamaha", Apr. 2, 1997, 1 page, http://www.theautochannel.com/news/Headlines2–Motorsports.html?SPORTS.
Source News & Reports, Grossmont Bank, by Robert Jablon Associated Press Writer, "Former Defense Firm Tries To Sell Auto Industry on New Valve Concept", Mar. 1, 1996, 3 pages.
SI: Aura New Auto Technology On th (#8/1499), The Go2Net Network, Ben Geh, Friday, Jul. 19, 1996. Reply #8 of 1499, 2 pages.

* cited by examiner

Primary Examiner—Hoang Nguyen
(74) Attorney, Agent, or Firm—Rosenthal & Osha L.L.P.

(57) ABSTRACT

A manifold alternator generator including a turbine located proximal to a flow of exhaust gases in an internal combustion engine where the exhaust gases energize the turbine and produce rotation of an output shaft. The output shaft is connected to a rotor that is engaged with a generator such that the rotation of the turbine and output shaft generates electrical power. The manifold alternator generator may be used in combination with electromagnetic valve actuators and a flywheel alternator/starter. A processor may be used to optimize the performance of the manifold alternator generator and other system components.

16 Claims, 5 Drawing Sheets

| | | | | | | | | | | | | | |
|---|---|---|---|---|---|---|---|---|---|---|---|---|---|
| 1 | p1= | 14.7 | | | | | | | | | | Qcal= | 19100 Btu/lb |
| 2 | T1= | 550 | | | | | | | | | | afuel= | 25 lb/lb |
| 3 | Rv | 10 | | | | | | | | | | | |
| 4 | Nm= | 0.95 | 0.95 | 0.95 | 0.95 | 0.95 | 0.95 | 0.95 | 0.95 | 0.95 | 0.95 | 0.95 | 0.95 |
| 5 | Bb | 0.7 | 0.7 | 0.7 | 0.7 | 0.7 | 0.7 | 0.7 | 0.7 | 0.7 | 0.7 | 0.7 | 0.7 |
| 6 | Bc | 0.2 | 0.2 | 0.2 | 0.2 | 0.2 | 0.2 | 0.2 | 0.2 | 0.2 | 0.2 | 0.2 | 0.2 |
| 7 | 1+Bb | 1.7 | 1.7 | 1.7 | 1.7 | 1.7 | 1.7 | 1.7 | 1.7 | 1.7 | 1.7 | 1.7 | 1.7 |
| 8 | 1-Bc | 0.8 | 0.8 | 0.8 | 0.8 | 0.8 | 0.8 | 0.8 | 0.8 | 0.8 | 0.8 | 0.8 | 0.8 |
| 9 | R | 43.3 | 43.3 | 43.3 | 43.3 | 43.3 | 43.3 | 43.3 | 43.3 | 43.3 | 43.3 | 43.3 | 43.3 |
| 10 | k | 1.4 | 1.4 | 1.4 | 1.4 | 1.4 | 1.4 | 1.4 | 1.4 | 1.4 | 1.4 | 1.4 | 1.4 |
| 11 | 1/k | 0.7 | 0.7 | 0.7 | 0.7 | 0.7 | 0.7 | 0.7 | 0.7 | 0.7 | 0.7 | 0.7 | 0.7 |
| 12 | k-1 | 0.4 | 0.4 | 0.4 | 0.4 | 0.4 | 0.4 | 0.4 | 0.4 | 0.4 | 0.4 | 0.4 | 0.4 |
| 13 | k+1 | 2.4 | 2.4 | 2.4 | 2.4 | 2.4 | 2.4 | 2.4 | 2.4 | 2.4 | 2.4 | 2.4 | 2.4 |
| 14 | k/(k-1) | 3.5 | 3.5 | 3.5 | 3.5 | 3.5 | 3.5 | 3.5 | 3.5 | 3.5 | 3.5 | 3.5 | 3.5 |
| 15 | (k-1)/k | 0.3 | 0.3 | 0.3 | 0.3 | 0.3 | 0.3 | 0.3 | 0.3 | 0.3 | 0.3 | 0.3 | 0.3 |
| 16 | Rv^(k-1) | 2.5 | 2.5 | 2.5 | 2.5 | 2.5 | 2.5 | 2.5 | 2.5 | 2.5 | 2.5 | 2.5 | 2.5 |
| 17 | p6/1^1/k | 1.1 | 1.2 | 1.3 | 1.4 | 1.5 | 1.6 | 1.7 | 1.7 | 1.8 | 1.9 | 2.0 | 2.0 |
| 18 | | | | | | | | | | | | | |
| 19 | dp= | 2.0 | | p6= | 17.7 | | | | | | | | |
| 20 | dp6= | 0 | 2 | 4 | 6 | 8 | 10 | 12 | 14 | 16 | 18 | 20 | 22 |
| 21 | p6'= | 17.7 | 19.7 | 21.7 | 23.7 | 25.7 | 27.7 | 29.7 | 31.7 | 33.7 | 35.7 | 37.7 | 39.7 |
| 22 | p6'/p1= | 1.2 | 1.34 | 1.48 | 1.61 | 1.75 | 1.88 | 2.02 | 2.16 | 2.29 | 2.43 | 2.56 | 2.7 |
| 23 | q.lb/lb= | 764 | 764 | 764 | 764 | 764 | 764 | 764 | 764 | 764 | 764 | 764 | 764 |
| 24 | p3/p1= | 72 | 72 | 72 | 72 | 72 | 72 | 72 | 72 | 72 | 72 | 72 | 72 |
| 25 | T5/T1= | 4.3 | 4.3 | 4.3 | 4.3 | 4.3 | 4.3 | 4.3 | 4.3 | 4.3 | 4.3 | 4.3 | 4.3 |
| 26 | | | | | | | | | | | | | |
| 27 | w1= | 344 | 344 | 344 | 344 | 344 | 344 | 344 | 344 | 344 | 344 | 344 | 344 |
| 28 | w2'= | 5 | 9 | 12 | 16 | 19 | 23 | 26 | 29 | 33 | 36 | 39 | 43 |
| 29 | w1'= | 339 | 335 | 331 | 328 | 325 | 321 | 318 | 314 | 311 | 308 | 304 | 301 |
| 30 | dw2'= | 0 | 3.8 | 7.3 | 10.7 | 14.1 | 17.5 | 20.9 | 24.3 | 27.7 | 31 | 34.3 | 37.7 |
| 31 | dw6= | 0 | 9.8 | 18.4 | 26.1 | 32.9 | 39.2 | 44.8 | 50 | 54.8 | 59.2 | 63.3 | 67.2 |
| 32 | dw6/2'= | 0 | 2.6 | 2.5 | 2.4 | 2.3 | 2.2 | 2.1 | 2.1 | 2 | 1.9 | 1.8 | 1.8 |
| 33 | | | | | | | | | | | | | |
| 34 | capCC= | 1000 | | alt.ft= | | 0.000 | | rpm= | | 1000 | | ccft3= | 3.53 10^5 |
| 35 | v.lb/ft3= | 11.3 | | | | | | | | | | | |
| 36 | m.lb/h= | 94 | | | | | | | | | | | kW |
| 37 | W1= | 9.5 | 9.5 | 9.5 | 9.5 | 9.5 | 9.5 | 9.5 | 9.5 | 9.5 | 9.5 | 9.5 | 9.5 |
| 38 | w2'= | 0.1 | 0.2 | 0.3 | 0.4 | 0.5 | 0.6 | 0.7 | 0.8 | 0.9 | 1.0 | 1.1 | 1.2 |
| 39 | W1'= | 9.4 | 9.3 | 9.2 | 9.1 | 9.0 | 8.9 | 8.8 | 8.7 | 8.6 | 8.5 | 8.4 | 8.3 |
| 40 | dW2'= | 0.0 | 0.1 | 0.2 | 0.3 | 0.4 | 0.5 | 0.6 | 0.7 | 0.8 | 0.9 | 1.0 | 1.0 |
| 41 | dW6= | 0.0 | 0.3 | 0.5 | 0.7 | 0.9 | 1.1 | 1.2 | 1.4 | 1.5 | 1.6 | 1.8 | 1.9 |
| 42 | | | | | | | | | | | | | |
| 43 | Compression vs. chilling; | | | | | | | | | | | | |
| 44 | dp= | 0.1 | | cp= | 0.24 | | COP= | 3.5 | | | | | Btu/lb |
| 45 | Rp= | 1.0 | 1.1 | 1.2 | 1.3 | 1.4 | 1.5 | 1.6 | 1.7 | 1.8 | 1.9 | 2.0 | 2.1 |
| 46 | wCom= | 0.0 | 2.1 | 4.1 | 6.0 | 7.7 | 9.4 | 11.0 | 12.5 | 14.0 | 15.4 | 16.6 | 18.1 |
| 47 | wRF= | 0.0 | 1.0 | 2.0 | 2.9 | 3.8 | 4.6 | 5.4 | 6.2 | 6.9 | 7.6 | 8.3 | 8.9 |
| 48 | Compx= | 0.0 | 2.0 | 2.0 | 2.0 | 2.0 | 2.0 | 2.0 | 2.0 | 2.0 | 2.0 | 2.0 | 2.0 |

Figure 3

| | | | | | | | | | | | | | |
|---|---|---|---|---|---|---|---|---|---|---|---|---|---|
| 1 | p1= | 14.7 | | | | | | | | | Qcal= | 19100 | Btu/lb |
| 2 | T1= | 550 | | | | | | | | | afuel= | 25 | lb/lb |
| 3 | Rv | 10 | | | | | | | | | | | |
| 4 | Nm= | 0.95 | 0.95 | 0.95 | 0.95 | 0.95 | 0.95 | 0.95 | 0.95 | 0.95 | 0.95 | 0.95 | 0.95 |
| 5 | Bb | 0.7 | 0.7 | 0.7 | 0.7 | 0.7 | 0.7 | 0.7 | 0.7 | 0.7 | 0.7 | 0.7 | 0.7 |
| 6 | Bc | 0.2 | 0.2 | 0.2 | 0.2 | 0.2 | 0.2 | 0.2 | 0.2 | 0.2 | 0.2 | 0.2 | 0.2 |
| 7 | 1+Bb | 1.7 | 1.7 | 1.7 | 1.7 | 1.7 | 1.7 | 1.7 | 1.7 | 1.7 | 1.7 | 1.7 | 1.7 |
| 8 | 1-Bc | 0.8 | 0.8 | 0.8 | 0.8 | 0.8 | 0.8 | 0.8 | 0.8 | 0.8 | 0.8 | 0.8 | 0.8 |
| 9 | R | 43.3 | 43.3 | 43.3 | 43.3 | 43.3 | 43.3 | 43.3 | 43.3 | 43.3 | 43.3 | 43.3 | 43.3 |
| 10 | k | 1.4 | 1.4 | 1.4 | 1.4 | 1.4 | 1.4 | 1.4 | 1.4 | 1.4 | 1.4 | 1.4 | 1.4 |
| 11 | 1/k | 0.7 | 0.7 | 0.7 | 0.7 | 0.7 | 0.7 | 0.7 | 0.7 | 0.7 | 0.7 | 0.7 | 0.7 |
| 12 | k-1 | 0.4 | 0.4 | 0.4 | 0.4 | 0.4 | 0.4 | 0.4 | 0.4 | 0.4 | 0.4 | 0.4 | 0.4 |
| 13 | k+1 | 2.4 | 2.4 | 2.4 | 2.4 | 2.4 | 2.4 | 2.4 | 2.4 | 2.4 | 2.4 | 2.4 | 2.4 |
| 14 | k/(k-1) | 3.5 | 3.5 | 3.5 | 3.5 | 3.5 | 3.5 | 3.5 | 3.5 | 3.5 | 3.5 | 3.5 | 3.5 |
| 15 | (k-1)/k | 0.3 | 0.3 | 0.3 | 0.3 | 0.3 | 0.3 | 0.3 | 0.3 | 0.3 | 0.3 | 0.3 | 0.3 |
| 16 | Rv^(k-1) | 2.5 | 2.5 | 2.5 | 2.5 | 2.5 | 2.5 | 2.5 | 2.5 | 2.5 | 2.5 | 2.5 | 2.5 |
| 17 | p6/1^1/k | 1.1 | 1.2 | 1.3 | 1.4 | 1.5 | 1.6 | 1.7 | 1.7 | 1.8 | 1.9 | 2 | 2 |
| 18 | | | | | | | | | | | | | |
| 19 | dp= | 2 | | p6= | 17.7 | | | | | | | | |
| 20 | dp6= | 0 | 2 | 4 | 6 | 8 | 10 | 12 | 14 | 16 | 18 | 20 | 22 |
| 21 | p6'= | 17.7 | 19.7 | 21.7 | 23.7 | 25.7 | 27.7 | 29.7 | 31.7 | 33.7 | 35.7 | 37.7 | 39.7 |
| 22 | p6'/p1= | 1.2 | 1.34 | 1.48 | 1.61 | 1.75 | 1.88 | 2.02 | 2.16 | 2.29 | 2.43 | 2.56 | 2.7 |
| 23 | q.lb/lb= | 764 | 764 | 764 | 764 | 764 | 764 | 764 | 764 | 764 | 764 | 764 | 764 |
| 24 | p3/p1= | 72 | 72 | 72 | 72 | 72 | 72 | 72 | 72 | 72 | 72 | 72 | 72 |
| 25 | T5/T1= | 4.3 | 4.3 | 4.3 | 4.3 | 4.3 | 4.3 | 4.3 | 4.3 | 4.3 | 4.3 | 4.3 | 4.3 |
| 26 | | | | | | | | | | | | | |
| 27 | w1= | 344 | 344 | 344 | 344 | 344 | 344 | 344 | 344 | 344 | 344 | 344 | 344 |
| 28 | w2'= | 5 | 9 | 12 | 16 | 19 | 23 | 26 | 29 | 33 | 36 | 39 | 43 |
| 29 | w1'= | 339 | 335 | 331 | 328 | 325 | 321 | 318 | 314 | 311 | 308 | 304 | 301 |
| 30 | dw2'= | 0.0 | 3.8 | 7.3 | 10.7 | 14.1 | 17.5 | 20.9 | 24.3 | 27.7 | 31.0 | 34.3 | 37.7 |
| 31 | dw6= | 0.0 | 9.8 | 18.4 | 26.1 | 32.9 | 39.2 | 44.8 | 50.0 | 54.8 | 59.2 | 63.3 | 67.2 |
| 32 | dw6/2'= | 0.0 | 2.6 | 2.5 | 2.4 | 2.3 | 2.2 | 2.1 | 2.1 | 2.0 | 1.9 | 1.8 | 1.8 |
| 33 | | | | | | | | | | | | | |
| 34 | capCC= | 1000 | | alt.ft= | | 0.000 | | rpm= | 3000 | | ccft3= | 3.53 | /10^5 |
| 35 | v.lb/ft3= | 11.3 | | | | | | | | | | | |
| 36 | m.lb/h= | 282 | | | | | | | | | | | kW |
| 37 | W1= | 28.5 | 28.5 | 28.5 | 28.5 | 28.5 | 28.5 | 28.5 | 28.5 | 28.5 | 28.5 | 28.5 | 28.5 |
| 38 | w2'= | 0.4 | 0.7 | 1 | 1.3 | 1.6 | 1.9 | 2.2 | 2.4 | 2.7 | 3 | 3.3 | 3.5 |
| 39 | W1'= | 28.1 | 27.8 | 27.5 | 27.2 | 27 | 26.7 | 26.4 | 26.1 | 25.8 | 25.6 | 25.3 | 25 |
| 40 | dW2'= | 0 | 0.3 | 0.6 | 0.9 | 1.2 | 1.5 | 1.7 | 2 | 2.3 | 2.6 | 2.9 | 3.1 |
| 41 | dW6= | 0 | 0.8 | 1.5 | 2.2 | 2.7 | 3.3 | 3.7 | 4.2 | 4.6 | 4.9 | 5.3 | 5.6 |
| 42 | | | | | | | | | | | | | |
| 43 | Compression vs. chilling; | | | | | | | | | | | | |
| 44 | dp= | 0.1 | | cp= | 0.24 | | COP= | 3.5 | | | | | Btu/lb |
| 45 | Rp= | 1.0 | 1.1 | 1.2 | 1.3 | 1.4 | 1.5 | 1.6 | 1.7 | 1.8 | 1.9 | 2.0 | 2.1 |
| 46 | wCom= | 0.0 | 2.1 | 4.1 | 6.0 | 7.7 | 9.4 | 11.0 | 12.5 | 14.0 | 15.4 | 16.6 | 18.1 |
| 47 | wRF= | 0.0 | 1.0 | 2.0 | 2.9 | 3.8 | 4.6 | 5.4 | 6.2 | 6.9 | 7.6 | 8.3 | 8.9 |
| 48 | Compx= | 0.0 | 2.0 | 2.0 | 2.0 | 2.0 | 2.0 | 2.0 | 2.0 | 2.0 | 2.0 | 2.0 | 2.0 |

Figure 4

| | | | | | | | | | | | | | | |
|---|---|---|---|---|---|---|---|---|---|---|---|---|---|---|
| 1 | p1= | 14.7 | | | | | | | | | Qcal= | | 19100 | Btu/lb |
| 2 | T1= | 550 | | | | | | | | | afuel= | | 25 | lb/lb |
| 3 | Rv | 10 | | | | | | | | | | | | |
| 4 | Nm= | 0.95 | 0.95 | 0.95 | 0.95 | 0.95 | 0.95 | 0.95 | 0.95 | 0.95 | 0.95 | 0.95 | 0.95 | |
| 5 | Bb | 0.7 | 0.7 | 0.7 | 0.7 | 0.7 | 0.7 | 0.7 | 0.7 | 0.7 | 0.7 | 0.7 | 0.7 | |
| 6 | Bc | 0.2 | 0.2 | 0.2 | 0.2 | 0.2 | 0.2 | 0.2 | 0.2 | 0.2 | 0.2 | 0.2 | 0.2 | |
| 7 | 1+Bb | 1.7 | 1.7 | 1.7 | 1.7 | 1.7 | 1.7 | 1.7 | 1.7 | 1.7 | 1.7 | 1.7 | 1.7 | |
| 8 | 1-Bc | 0.8 | 0.8 | 0.8 | 0.8 | 0.8 | 0.8 | 0.8 | 0.8 | 0.8 | 0.8 | 0.8 | 0.8 | |
| 9 | R | 43.3 | 43.3 | 43.3 | 43.3 | 43.3 | 43.3 | 43.3 | 43.3 | 43.3 | 43.3 | 43.3 | 43.3 | |
| 10 | k | 1.4 | 1.4 | 1.4 | 1.4 | 1.4 | 1.4 | 1.4 | 1.4 | 1.4 | 1.4 | 1.4 | 1.4 | |
| 11 | 1/k | 0.7 | 0.7 | 0.7 | 0.7 | 0.7 | 0.7 | 0.7 | 0.7 | 0.7 | 0.7 | 0.7 | 0.7 | |
| 12 | k-1 | 0.4 | 0.4 | 0.4 | 0.4 | 0.4 | 0.4 | 0.4 | 0.4 | 0.4 | 0.4 | 0.4 | 0.4 | |
| 13 | k+1 | 2.4 | 2.4 | 2.4 | 2.4 | 2.4 | 2.4 | 2.4 | 2.4 | 2.4 | 2.4 | 2.4 | 2.4 | |
| 14 | k/(k-1) | 3.5 | 3.5 | 3.5 | 3.5 | 3.5 | 3.5 | 3.5 | 3.5 | 3.5 | 3.5 | 3.5 | 3.5 | |
| 15 | (k-1)/k | 0.3 | 0.3 | 0.3 | 0.3 | 0.3 | 0.3 | 0.3 | 0.3 | 0.3 | 0.3 | 0.3 | 0.3 | |
| 16 | Rv^(k-1) | 2.5 | 2.5 | 2.5 | 2.5 | 2.5 | 2.5 | 2.5 | 2.5 | 2.5 | 2.5 | 2.5 | 2.5 | |
| 17 | p6/1^1/k | 1.1 | 1.2 | 1.2 | 1.2 | 1.2 | 1.3 | 1.3 | 1.3 | 1.3 | 1.3 | 1.4 | 1.4 | |
| 18 | | | | | | | | | | | | | | |
| 19 | dp= | 0.5 | | p6= | | 17.7 | | | | | | | | |
| 20 | dp6= | 0 | 0.5 | 1 | 1.5 | 2 | 2.5 | 3 | 3.5 | 4 | 4.5 | 5 | 5.5 | |
| 21 | p6'= | 17.7 | 18.2 | 18.7 | 19.2 | 19.7 | 20.2 | 20.7 | 21.2 | 21.7 | 22.2 | 22.7 | 23.2 | |
| 22 | p6'/p1= | 1.2 | 1.24 | 1.27 | 1.31 | 1.34 | 1.37 | 1.41 | 1.44 | 1.48 | 1.51 | 1.54 | 1.58 | |
| 23 | q.lb/lb= | 764 | 764 | 764 | 764 | 764 | 764 | 764 | 764 | 764 | 764 | 764 | 764 | |
| 24 | p3/p1= | 72 | 72 | 72 | 72 | 72 | 72 | 72 | 72 | 72 | 72 | 72 | 72 | |
| 25 | T5/T1= | 4.3 | 4.3 | 4.3 | 4.3 | 4.3 | 4.3 | 4.3 | 4.3 | 4.3 | 4.3 | 4.3 | 4.3 | |
| 26 | | | | | | | | | | | | | | |
| 27 | w1= | 344 | 344 | 344 | 344 | 344 | 344 | 344 | 344 | 344 | 344 | 344 | 344 | |
| 28 | w2'= | 5 | 6 | 7 | 8 | 9 | 10 | 11 | 11 | 12 | 13 | 14 | 15 | |
| 29 | w1'= | 339 | 337 | 337 | 336 | 335 | 334 | 333 | 332 | 331 | 331 | 330 | 329 | |
| 30 | dw2'= | 0.0 | 1.2 | 2.1 | 2.9 | 3.8 | 4.7 | 5.5 | 6.4 | 7.3 | 8.1 | 9.0 | 9.9 | |
| 31 | dw6= | 0.0 | 2.6 | 5.1 | 7.5 | 9.8 | 12.1 | 14.3 | 16.4 | 18.4 | 20.4 | 22.4 | 24.3 | |
| 32 | dw6/2'= | 0.0 | 2.2 | 2.5 | 2.6 | 2.6 | 2.6 | 2.6 | 2.6 | 2.5 | 2.5 | 2.5 | 2.5 | |
| 33 | | | | | | | | | | | | | | |
| 34 | capCC= | 1000 | | alt.ft= | | 0.000 | | rpm= | | 3000 | | ccft3= | | 3.53 /10^5 |
| 35 | v.lb/ft3= | 11.3 | | | | | | | | | | | | |
| 36 | m.lb/h= | 282 | | | | | | | | | | | | kW |
| 37 | W1= | 28.5 | 28.5 | 28.5 | 28.5 | 28.5 | 28.5 | 28.5 | 28.5 | 28.5 | 28.5 | 28.5 | 28.5 | |
| 38 | w2'= | 0.4 | 0.5 | 0.6 | 0.7 | 0.7 | 0.8 | 0.9 | 0.9 | 1 | 1.1 | 1.2 | 1.2 | |
| 39 | W1'= | 28.1 | 28 | 28 | 27.9 | 27.8 | 27.7 | 27.7 | 27.6 | 27.5 | 27.5 | 27.4 | 27.3 | |
| 40 | dW2'= | 0 | 0.1 | 0.2 | 0.2 | 0.3 | 0.4 | 0.5 | 0.5 | 0.6 | 0.7 | 0.7 | 0.8 | |
| 41 | dW6= | 0 | 0.2 | 0.4 | 0.6 | 0.8 | 1 | 1.2 | 1.4 | 1.5 | 1.7 | 1.9 | 2 | |
| 42 | | | | | | | | | | | | | | |
| 43 | Compression vs. chilling; | | | | | | | | | | | | | |
| 44 | dp= | 0.1 | | cp= | | 0.24 | | COP= | | 3.5 | | | | Btu/lb |
| 45 | Rp= | 1.0 | 1.1 | 1.2 | 1.3 | 1.4 | 1.5 | 1.6 | 1.7 | 1.8 | 1.9 | 2.0 | 2.1 | |
| 46 | wCom= | 0.0 | 2.1 | 4.1 | 6.0 | 7.7 | 9.4 | 11.0 | 12.5 | 14.0 | 15.4 | 16.6 | 18.1 | |
| 47 | wRF= | 0.0 | 1.0 | 2.0 | 2.9 | 3.8 | 4.6 | 5.4 | 6.2 | 6.9 | 7.6 | 8.3 | 8.9 | |
| 48 | Compx= | 0.0 | 2.0 | 2.0 | 2.0 | 2.0 | 2.0 | 2.0 | 2.0 | 2.0 | 2.0 | 2.0 | 2.0 | |

MANIFOLD ALTERNATOR GENERATOR

This application claims priority from previously filed South African provisional application No. 99/2096, filed Mar. 16, 1999.

BACKGROUND OF THE INVENTION

1. Technical Field

The invention relates generally to an alternator for an internal combustion engine. More specifically, the invention relates to an alternator that produces electrical power from the exhaust gases in the exhaust manifold of an internal combustion engine.

2. Background Art

Conventional alternators for internal combustion engines are known in the art. In a typical internal combustion engine, the alternator serves to charge the battery so that the battery may, in turn, provide electrical power to the auxiliary systems of the automobile. In general, prior art alternators are driven by the crankshaft of the engine. The alternator is typically linked to the crankshaft with an elastomer belt or a chain drive assembly.

Because the alternator is driven by the crankshaft assembly, the total power available to the drive train of the automobile is reduced. The belt or chain driven alternator generates drag and may reduce engine performance. Moreover, the inertia of the alternator is linked directly to the crankshaft and may have negative effects. Alternator-induced losses may be accentuated by "over-speeding" that occurs during normal driving operations.

Further engine losses are induced when other auxiliary devices, such as the air-conditioning system, the power steering system and/or the engine fan are connected to the crankshaft. These losses are cumulative and degrade engine performance.

Possible solutions to the problems posed by prior art alternators and auxiliary devices have been developed in the automobile industry. An early attempt to compensate for the losses induced by auxiliary systems included the introduction of the turbo charger. The turbo charger operates at high speeds (e.g., 100,000 revolutions per minute ("rpm")) and generates high-pressures to boost engine performance.

Recently, a flywheel alternator/starter system sold under the trademark FAS, which is a mark of Aura Systems, Inc., has been designed to replace both the starter and alternator in an internal combustion engine. The alternator/starter system is designed to provide increased electrical power when the engine is operating at lower speeds. The alternator/starter system is typically smaller than and has less inertia than a conventional alternator. The alternator/starter system is powered by the engine crankshaft. A possible application of the flywheel alternator/starter system is the "instantaneous start/stop" system that is being examined by automobile manufacturers.

Furthermore, an electromagnetic valve actuator system has been designed and is sold under the trademark EVA, which is a mark of Aura Systems, Inc. The electromagnetic valve actuator system is designed to increase engine efficiency and reduce emissions by eliminating the conventional valve-train in an internal combustion engine. The electromagnetic valve actuator system controls valve timing using two electromagnets that latch the valve in either the open or the closed position. The electromagnetic valve actuator system provides multi-fuel capabilities for automobile engines and may optimize engine performance by providing rapid valve operation and continuous, adaptive fuel-air control.

Further advances in the field of hybrid automobiles are still in development. An example of hybrid technology is an automobile powered by hydrogen fuel cells. Fuel cells provide energy for powering the drive train through chemical reaction. Further research and development of fuel cell technology is required because currently, fuel cells are expensive, inefficient, and must be chilled to very low temperatures to operate. Other hybrids, including electrically powered automobiles, are still in developmental stages.

Thus, there is a need to optimize the performance of existing internal combustion engines by reducing the negative effects of linking component parts to the crankshaft. Moreover, there is a need to integrate emerging technology into a system that optimizes engine performance, increases fuel efficiency, and improves emission control.

SUMMARY OF THE INVENTION

One aspect of the invention includes an alternator for an internal combustion engine that includes a turbine, an output shaft, a rotor, and a generator. The turbine is energized by the flow of exhaust gases through an exhaust manifold such that rotational motion is imparted to the output shaft and rotor. The rotation of the rotor within the generator produces electrical power.

Another aspect of the invention includes a system for optimizing the performance of an internal combustion engine, including a manifold alternator generator, electromagnetic valve actuators, and a processor. The system modulates the exhaust gases to produce optimal engine performance during idle, normal operation, acceleration, and deceleration. Moreover, the invention optimizes the thermodynamic efficiency of the engine.

Other aspects and advantages of the invention will be apparent from the following description and the appended claims.

DETAILED DESCRIPTION

Embodiments of the invention are presented in FIGS. 1–6. The discussion of the manifold alternator generator system is based upon the integration of the system into an automobile engine. However, this example is intended to clarify the description of the invention and is not intended to limit the scope of the invention. The manifold alternator generator may be incorporated into any internal combustion engine.

Figure 1:
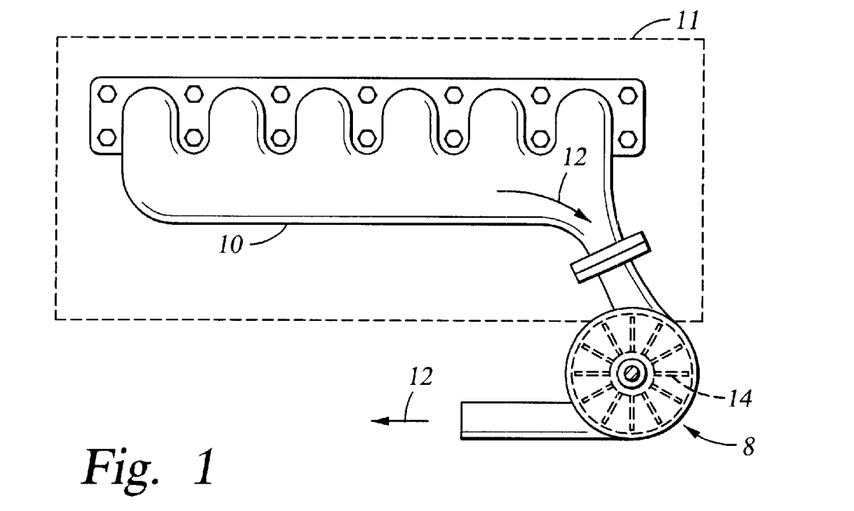
FIG. 1 shows a diagram of an embodiment of the invention.

One embodiment of the invention is shown in FIG. 1 and includes a manifold alternator generator ("MAG") 8 with a turbine 14. The MAG 8 is operatively connected to an exhaust manifold 10 on an internal combustion engine 11. Waste gases from the combustion in piston chambers (not shown) and additional exhaust gases produced by controlled exhaust augmentation of the internal combustion engine 11 produce an exhaust flow 12 that energizes the turbine 14 that may be interposed in the flow 12.

Figure 2:
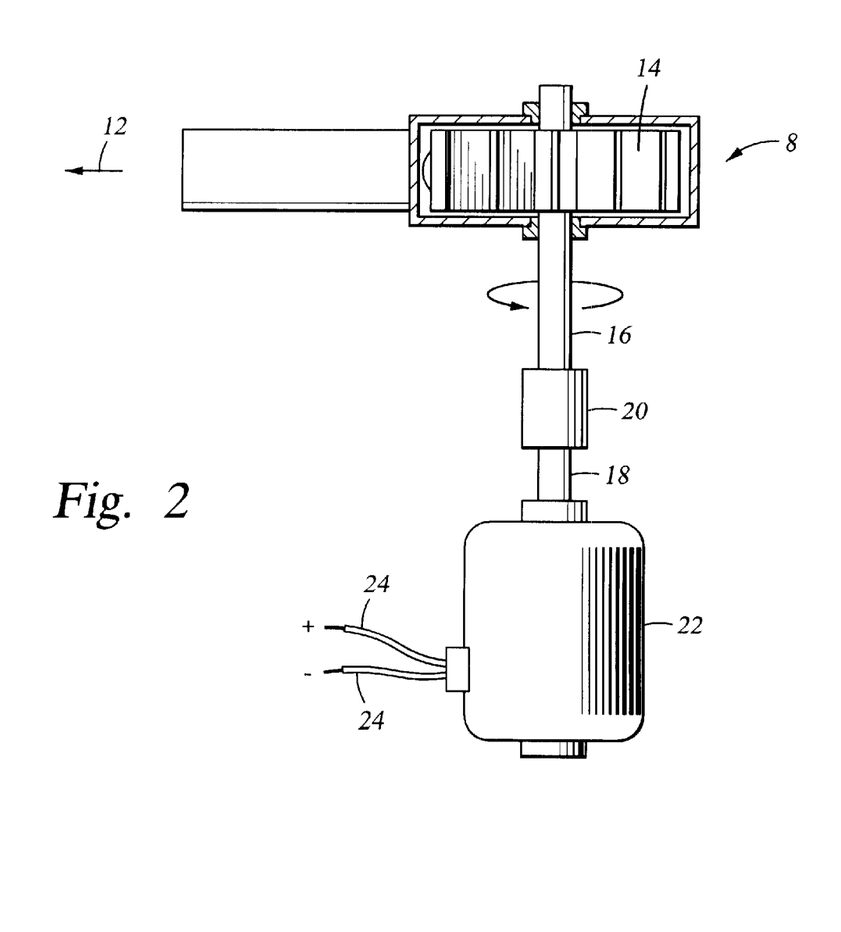
FIG. 2 shows a schematic view of an embodiment of the invention.

Another embodiment of the invention is shown in FIG. 2 and illustrates the interaction of the elements of the MAG 8. The exhaust flow 12 energizes the turbine 14 which ultimately produces rotational motion of the output shaft 16. The embodiment of FIG. 2 shows that the output shaft 16 is coupled to rotor 18 with coupling device 20. Coupling devices are known in the art and the presence of this element in the embodiment of FIG. 2 is not intended to limit the scope of the invention. An example of a coupling device 20 is a flexible coupling that compensates for misalignment between the output shaft 16 and the rotor 18.

The rotation of shaft 16 is translated to the rotor 18 through the coupling 20. The rotor 18 rotates within generator 22 such that electrical power is produced. The electrical power is distributed to auxiliary systems through electrical leads 24. Typically, the electrical power is conducted to a battery (not shown) which distributes electricity to various components (e.g., automobile headlamps, etc.). The MAG 8, when used in this manner, provides power to auxiliary systems (e.g., air-conditioning systems, power steering systems, etc.) without capturing energy directly from the crankshaft. The result is increased efficiency and an overall increase in the power available to a drive train (not shown) coupled to the engine 11.

The interposition of the turbine 14 in the exhaust flow 12 captures some of the energy present in the waste gases that are a by-product of the combustion in the engine. Efficient use of the exhaust power involves capturing two energy components: a "free" waste component and a crankshaft component. The free waste component is available without taking away from the power available to the crankshaft and is produced by the intrinsic kinetic energy content of the exhaust gases. The crankshaft component relates to combustion energy that is extracted from the engine system via adaptive valve control, resulting in a power loss to the drive train. However, the power loss experienced by the capture of the crankshaft component is substantially less than the power loss experienced by conventional crankshaft driven alternators. In one embodiment of the invention, using the energy of the exhaust waste gases provides a 60% reduction in power loss when compared to the power loss in conventional crankshaft driven alternators and their ancillary components (e.g., air conditioning systems).

The reduction in the loss of power in the alternator system of the invention as compared to a conventional alternator is evident in the calculation of the thermodynamic efficiency of the internal combustion engine. Modeling was performed using the equations of state for a naturally aspirated four-stroke, spark ignition, internal combustion engine as presented by S. L. Soo, *Engineering Thermodynamics* (Prentice Hall 1958). The approximate kinetic MAG/turbo work/loss may be inferred from the ideal gas law as:

$$\frac{W6}{(R)(T5)} = (k-1)\left(1 - \left[\frac{p6}{p6+dp}\right]\right)^{\frac{(k-1)}{k}} \quad \text{Equation 1}$$

where

W6=gross manifold alternator generator output

R=universal gas constant

T5=manifold temperature (in deg K)

k=polytropic constant for air ($C_p/C_v$)

p6=manifold pressure dp=blow down increments

Figure 3:
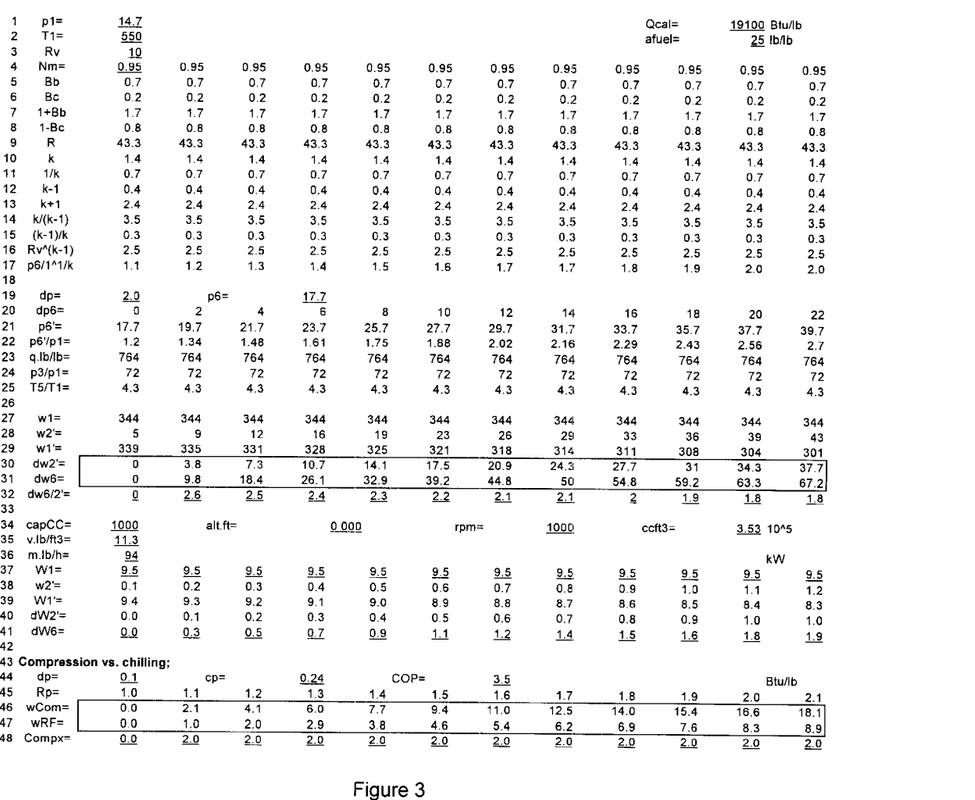
FIG. 3 shows an example of the simulated performance of an internal combustion engine with a manifold alternator generator.
Figure 4:
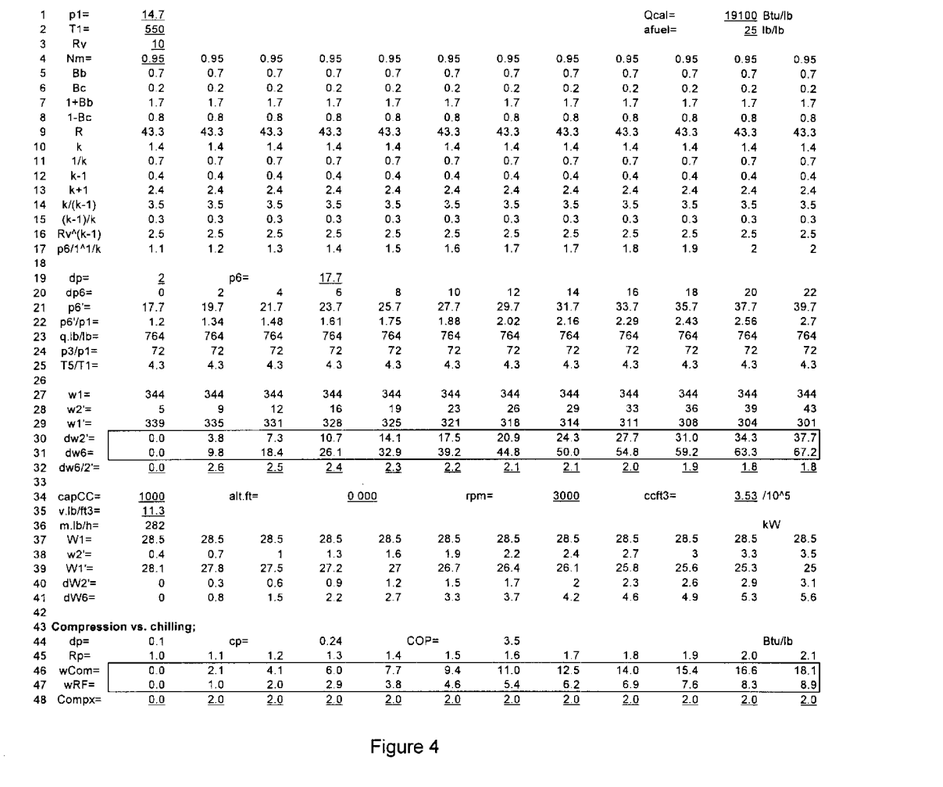
FIG. 4 shows an example of the simulated performance of an internal combustion engine with a manifold alternator generator.
Figure 5:
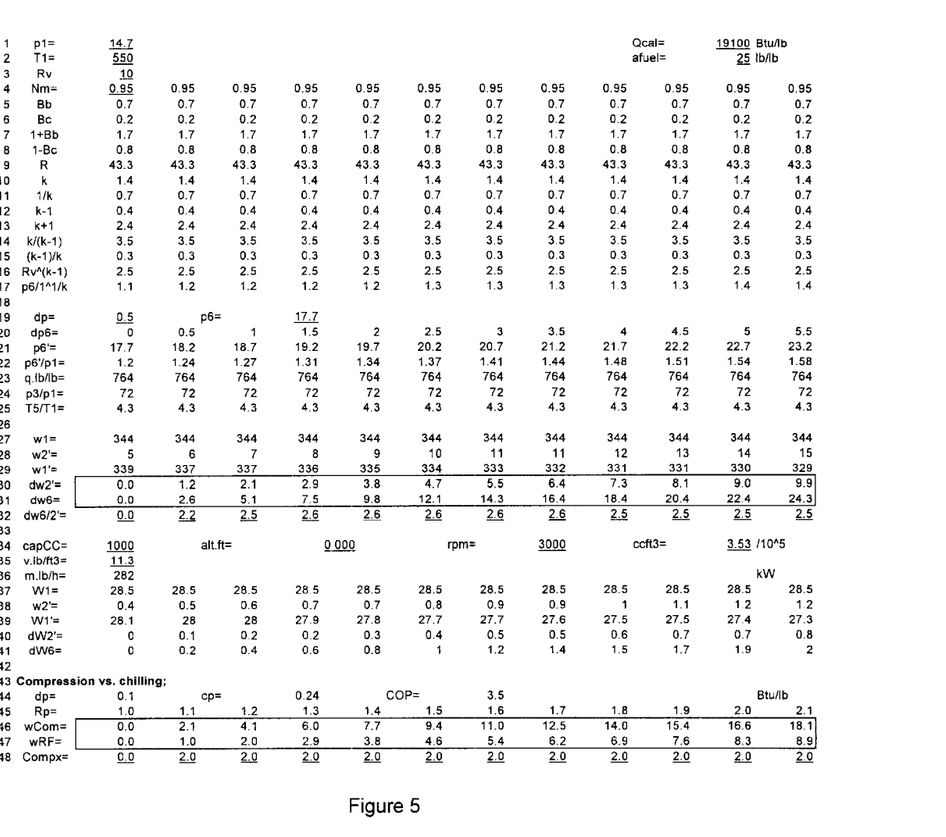
FIG. 5 shows an example of the simulated performance of an internal combustion engine with a manifold alternator generator.

A model system for an internal combustion engine is based on Equation 1. The model system and a computational corollary are presented in FIGS. 3–5. Note that the calculations used to produce FIGS. 3–5 exclude the initial "free" waste component due to the intrinsic kinetic energy content of the exhaust gases. The following terms are useful in interpreting the data in FIGS. 3–5:

q=heat of combustion (BTU);

Rv=volumetric compression ratio;

Nb=combustion efficiency;

Nm=mechanical efficiency;

Bb=cycle factorial;

Bc=cooling loss;

p1=ambient pressure in pounds per square inch (psi);

T1=ambient temperature in degrees Kelvin (deg K);

dp6'=blow down gradient;

P6'=induced manifold pressure;

w1=gross work output per pound of air;

w2'=negative loop work input per pound of air;

w1'=net work output (standard four-stroke cycle);

dw2'=MAG induced negative work loop input;

dw6=MAG work output per pound of air;

dw6/2'=dw6/dw2'=thermodynamic efficiency (MAG efficiency);

capCC=engine capacity in $cm^3$;

alt.ft.=altitude in feet;

Rpm=engine revolutions per minute;

ccft3=conversion ratio;

v.lb.ft3=specific volume of air;

m/lb/h=air mass flow rate;

W1=engine output in kW;

w2'=W2'=MAG negative loop work in kW;

W1'=net engine output in kW;

DW2'=negative loop work in kW;

DW6'=MAG output in kW;

cp=specific heat of air;

COP=refrigerative efficiency;

Rp=boost press ratio;

Wcom=turbo work input/requirement;

WRF=refrigerative work input/requirement; and

Compx=pre-cooling versus turbo efficiency.

Referring to FIG. 3, with incremental pressure gains of 2.0 psi (e.g., with a base of approximately 1.7 psi to 2.0 psi above ambient pressure), a total of 1.9 kW can be extracted from the piston chambers with a resulting thermodynamic efficiency of 1.8. Recall that the thermodynamic efficiency of the system is defined in the models presented above as dw6/2'. The engine in the model of FIG. 4 has a capacity of 1000 $cm^3$ (1000 cc) and rotates at 1000 rpm.

Referring to FIG. 4, an engine with a capacity of 1000 cc rotating at 3000 rpm is modeled with incremental pressure gains of 2.0 psi. A total of 5.6 kW of energy may be extracted from the piston chambers with a thermodynamic efficiency of 1.8.

The effect of changing the incremental pressure gains is illustrated in FIG. 5. In this model, with an incremental pressure gain of 0.5 psi (with a base of about 1.7 psi to 2.0 psi above ambient), a total of 2.0 kW can be extracted from the piston chambers with a resultant thermodynamic efficiency of 2.5.

Rows 37 and 39 in FIGS. 3–5 illustrate the net engine output prior to and subsequent to augmented exhaust discharging, respectively. Rows 43–48 illustrate the synergy (or efficiency) of cooling the exhaust flow. The Figures illustrate that the "cost" (e.g., energy loss) of cooling the exhaust flow (e.g., boosting the ambient mass flow) is about 50% of the cost of turbo compression.

Figure 6:
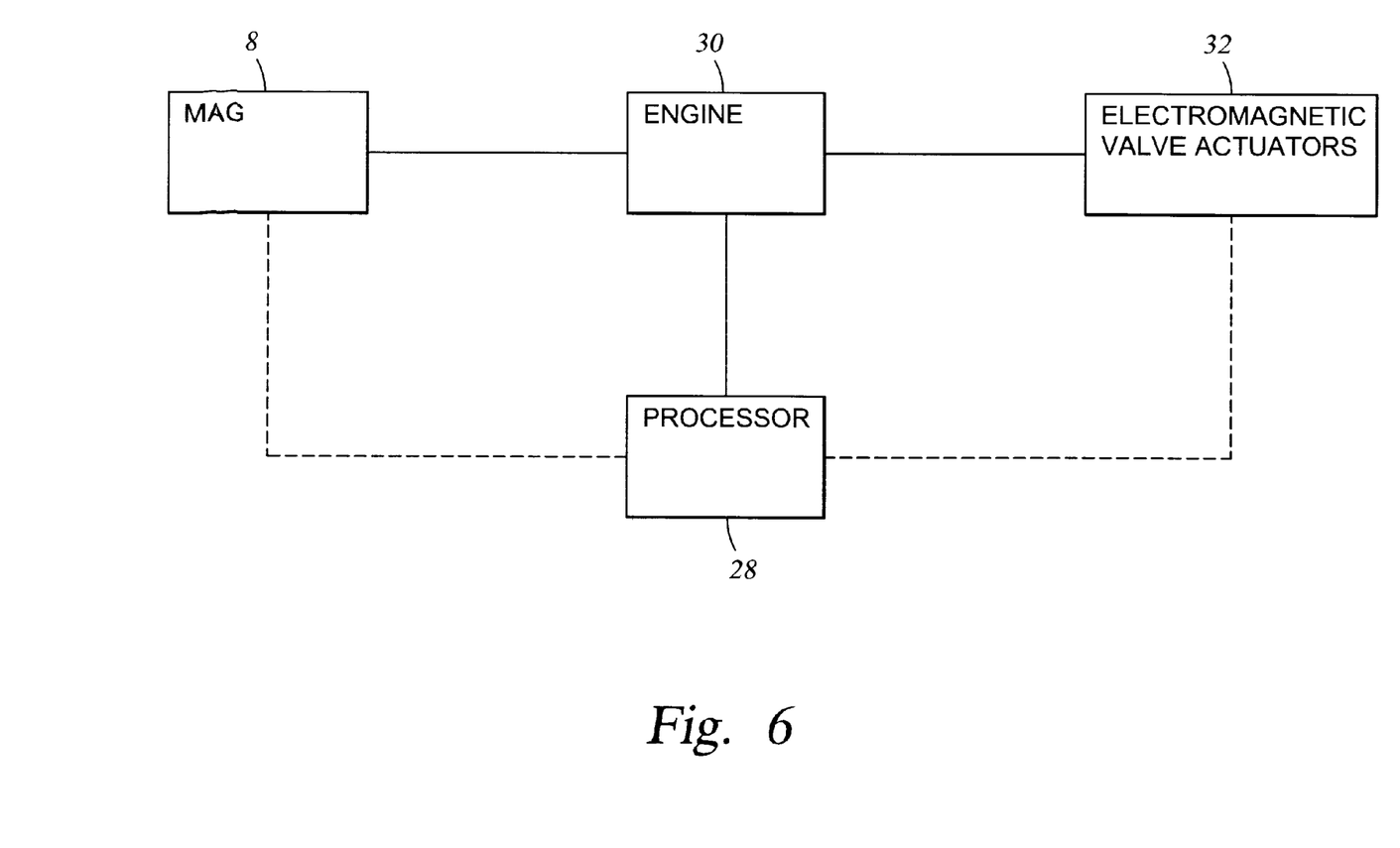
FIG. 6 shows a schematic view of an embodiment of the invention that shows the integration of the manifold alternator generator into a system.

Another embodiment of the invention is shown in FIG. 6. The MAG 8 is shown with an internal combustion engine 30 and an electromagnetic valve actuator system 32. The output of the MAG 8 is regulated by a processor 28 that is connected to the MAG 8, the engine 30, and the electromagnetic valve actuator system 32. The processor 28, using system 32 to operate the valves, may be used to infinitesimally regulate the adaptive valve timing to optimize combustion in the engine 30. The optimized combustion increases efficiency and decreases emissions. Moreover, the processor 28 may be used to execute programs that maintain constant load-speed profiles. For example, the power transmission may be managed to maintain constant air-conditioner output with variable engine speeds. Furthermore, when a MAG 8 is used with an electromagnetic valve actuator system 32 (where one valve cycle may occur approximately every 1/3000th of a second), the exhaust gas discharge can be optimally and substantially instantaneously modulated in order to optimize performance during idle, normal, or transitional (e.g., accelerating or decelerating) operation of the engine 30.

The electromagnetic valve actuator system 32 also permits adaptive valve timing that may be used to modulate the exhaust valve operation. Modulating the exhaust valve timing may permit the generation of a substantially constant load-speed curve regardless of whether the automobile is idling, cruising, accelerating, or decelerating. For example, when the engine is idling, the exhaust valve timing may be adjusted so that a greater discharge of exhaust gases is provided to power the MAG 8. This type of exhaust valve modulation is often referred to as "blow-down augmentation." Note that modifying or increasing the exhaust blow-down does not affect combustion efficiency or emission output.

Another embodiment of the invention (not shown in the Figures) includes a MAG operatively coupled to a flywheel alternator/starter to produce a "turbo charger" or power booster that is able to provide high voltage power transmission to the various engine components. As opposed to a conventional turbo charger where the turbine must spin at very high speeds (approximately 100,000 rpm) in order to drive the turbo compressor effectively, the turbine of the MAG/flywheel alternator-generator system may be scaled to operate at lower speeds (approximately 20,000 rpm to 30,000 rpm). The lower speed operation may enhance the efficiency of the system and may increase the life of mechanical components.

In the case of a conventional alternator, the power is tapped directly from the crankshaft at a 1:1 gain in engine output. When a MAG is used, the ratio may be approximately 1:2,5 (excluding the first few kilowatts that are "free" energy in terms of the "turbo" axiom). If substantially more power (10–20 kW) is extracted, it is possible that, with the combination of a MAG and a flywheel alternator/starter, the gain may drop to approximately 1:2.

The MAG system enables the capture of the energy of the exhaust flow. The MAG system uses the waste energy and heat from the exhaust flow and may reduce emissions and produce cooler exhaust. Moreover, incorporation of MAG technology may lead to smaller engines. The extraction of waste energy and heat from the exhaust flow and the introduction of smaller engines would lessen the impact of internal combustion engines on the environment.

Moreover, the MAG system provides a system for optimizing the performance of internal combustion engines. The MAG may be integrated into existing engines and may be adapted for use in future engines. The MAG provides a link between existing internal combustion engine technology and future developments in automobile drive systems.

Those skilled in the art will appreciate that other embodiments of the invention can be devised which do not depart from the spirit of the invention as disclosed herein. Accordingly, the scope of the invention should be limited only by the attached claims.

What is claimed is:

1. An alternator for an internal combustion engine comprising:
    a turbine located proximal to an exhaust manifold of the engine;
    an output shaft operatively connected to the turbine;
    a rotor operatively connected to the output shaft; and
    a generator operatively engaged with the rotor, wherein a flow of exhaust gases through the exhaust manifold energizes the turbine and produces rotational motion of the output shaft and rotor such that electrical power is generated and distributed to a battery and vehicle auxiliary systems, and wherein the alternator is not coupled to an output shaft of the internal combustion engine, and wherein the output of the alternator can be regulated by using electromagnetic valve actuators to adjust exhaust valve timing.

2. The alternator of claim 1, wherein the turbine is interposed substantially within the flow of exhaust gases through the exhaust manifold.

3. The alternator of claim 1, wherein the output shaft and the rotor comprise a unitary body.

4. The alternator of claim 1, wherein the alternator is operatively coupled with a flywheel alternator/starter to comprise a unit for further boosting engine power.

5. The alternator of claim 4 wherein the alternator operates at speeds between 20,000 revolutions per minute and 30,000 revolutions per minute.

6. A system for optimizing performance of an internal combustion engine comprising:
    a manifold alternator generator comprising a turbine disposed proximate an exhaust manifold of the engine, an output shaft operatively connected to the turbine, a rotor operatively connected to the output shaft, and a generator operatively engaged with the rotor, wherein a flow of exhaust gases through the exhaust manifold energizes the turbine and produces rotational motion of the output shaft and rotor such that electrical power is generated;
    electromagnetic valve actuators operatively coupled to the manifold alternator generator; and
    a processor operatively coupled to the electromagnetic valve actuators and to the manifold alternator generator, the processor adapted to selectively modulate generation of engine exhaust gases by adjusting valve timing.

7. The system of claim 6 wherein the modulation is substantially instantaneous.

8. The system of claim 6, wherein the processor optimizes engine performance during idle.

9. The system of claim 6, wherein the processor optimizes engine performance during acceleration.

10. The system of claim 6, wherein the processor optimizes engine performance during deceleration.

11. The system of claim 6, wherein the system can be programmed to maintain a substantially constant load-speed profile.

12. The system of claim 6, wherein system thermodynamic efficiency of the engine is between 1.8 and2.6.

13. An alternator for an internal combustion engine comprising:

a turbine located proximal to an exhaust manifold of the engine;

means for generating electrical power; and means for operatively connecting the turbine and the means for generating electrical power, wherein a flow of exhaust gases through the exhaust manifold energizes the turbine and produces rotational motion that energizes the means for generating electrical power such that electrical power is distributed to a battery and vehicle auxiliary systems, and wherein the alternator is not coupled to an output shaft of the internal combustion engine, and wherein output from the means for generating electrical power can be regulated by electromagnetic valve actuators to adjust an exhaust valve timing.

14. A system for optimizing performance of an internal combustion engine comprising:

a manifold alternator generator comprising a turbine disposed proximate an exhaust manifold of the engine, an output shaft operatively connected to the turbine, a rotor operatively connected to the output shaft, and a generator operatively engaged with the rotor, wherein a flow of exhaust gases through the exhaust manifold energizes the turbine and produces rotational motion of the output shaft and rotor such that electrical power is generated;

means for electromagnetically actuating valves; and means for controlling the manifold alternator generator and the electromagnetically actuated valves, wherein the means for controlling is adapted to selectively activate the means for electromagnetically actuating valves so as to modulate generation of exhaust gases.

15. The system of claim 6, further comprising a chiller adapted to chill the exhaust gases so as to increase a mass flow rate of the exhaust gases.

16. The system of claim 14, further comprising means for chilling the exhaust gases so as to increase a mass flow rate of the exhaust gases.

* * * * *

UNITED STATES PATENT AND TRADEMARK OFFICE
CERTIFICATE OF CORRECTION

PATENT NO. : 6,470,680 B1
DATED : October 29, 2002
INVENTOR(S) : Charl E. Janeke It is certified that error appears in the above-identified patent and that said Letters Patent is hereby corrected as shown below:

<u>Title page,</u>
Item [76], after "26645" change "Swam" to -- Swan --.
Item [56], U.S. PATENT DOCUMENTS, please insert:
-- US 6,170,444     01/2001     Ohlmann     123/69V
   US 4,694,654     09/1987     Kawamura     60/605 --
Item [56], FOREIGN PATENT DOCUMENTS, please insert:
-- 359141714   08/1984      Japan   Kawamura --

Signed and Sealed this

Twenty-seventh Day of May, 2003

JAMES E. ROGAN
*Director of the United States Patent and Trademark Office*